United States Patent
Furuya (10) Patent No.: US 7,010,140 B2
(45) Date of Patent: Mar. 7, 2006

(54) ELECTROACOUSTIC TRANSDUCER

(75) Inventor: Masahito Furuya, Yamanashi-ken (JP)

(73) Assignee: Citizen Electronics Co., Ltd., Yamanashi-ken (JP)

( * ) Notice: Subject to any disclaimer, the term of this patent is extended or adjusted under 35 U.S.C. 154(b) by 366 days.

(21) Appl. No.: 10/623,513

(22) Filed: Jul. 22, 2003

(65) Prior Publication Data

US 2004/0125981 A1    Jul. 1, 2004

(30) Foreign Application Priority Data

Jul. 25, 2002  (JP)  ............................... 2002-215923

(51) Int. Cl.
*H04R 25/00*    (2006.01)

(52) U.S. Cl. ...................... 381/396; 381/398

(58) Field of Classification Search .............. 381/386, 381/395, 189, 396, 398, 431; 181/171–173
See application file for complete search history.

(56) References Cited

U.S. PATENT DOCUMENTS

| | | | |
|---|---|---|---|
| 5,371,428 A | 12/1994 | Kikuchi et al. | |
| 6,738,489 B1 * | 5/2004 | Chung et al. | 381/396 |
| 6,751,332 B1 * | 6/2004 | Kobayashi et al. | 381/386 |
| 6,766,034 B1 * | 7/2004 | Kobayashi et al. | 381/396 |
| 6,834,114 B1 * | 12/2004 | Kobayashi et al. | 381/396 |
| 6,845,168 B1 * | 1/2005 | Kuwabara et al. | 381/396 |

\* cited by examiner

*Primary Examiner*—Suhan Ni
(74) *Attorney, Agent, or Firm*—Dennison, Schultz, Dougherty & MacDonald

(57) ABSTRACT

A plurality of grooves are radially formed in an annular frame and an annular plate is secured to the frame to form a sound discharge hole in each groove, thereby communicating a back chamber under a diaphragm with the atmosphere. A projected part is outwardly projected from a peripheral edge of the annular plate, and an adhesive is adhered to a peripheral edge of a protector and to an upper surface of the projected part to adhere the protector with the annular plate.

4 Claims, 9 Drawing Sheets

ELECTROACOUSTIC TRANSDUCER

BACKGROUND OF THE INVENTION

The present invention relates to an electroacoustic transducer such as a speaker, and more particularly to an electroacoustic transducer used in a small electronic instrument such as a portable telephone.

The speaker of the portable telephone has a diaphragm supported on cylindrical case.

In such a speaker, sound discharge holes are provided for discharging sounds in a back chamber on the rear side of the diaphragm. In recent years, there has been provided a speaker in which discharge holes are formed in a peripheral wall of a case.

Figure 11:
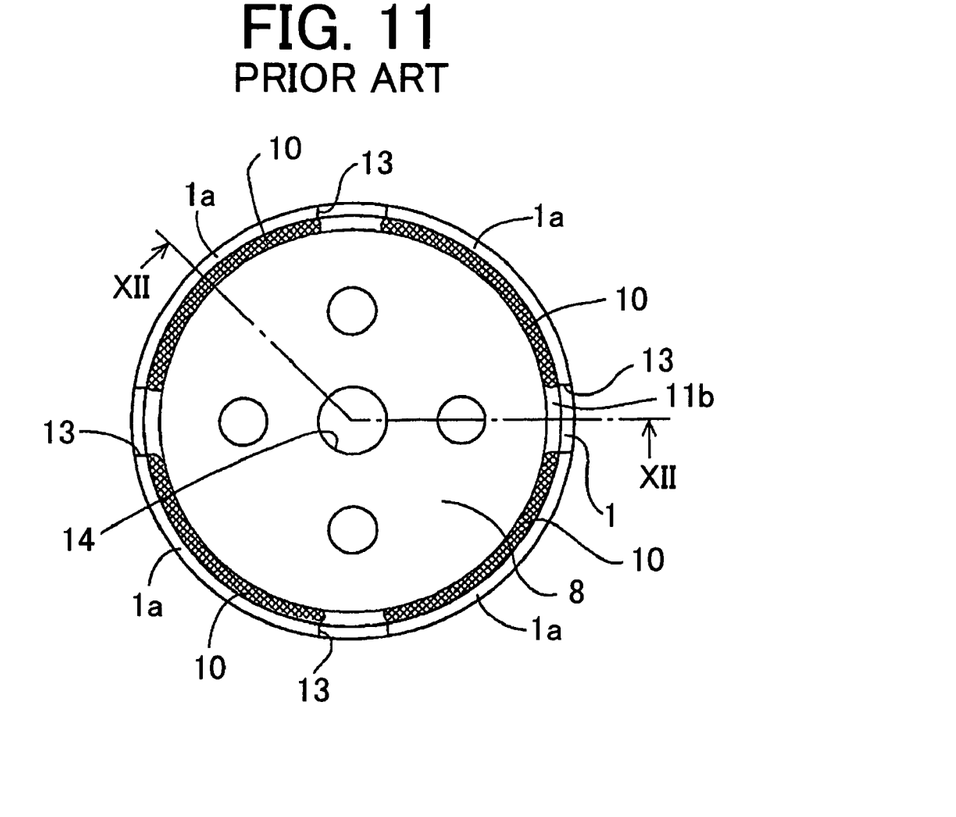
FIG. 11 is a plan view of a conventional speaker.
Figure 12:
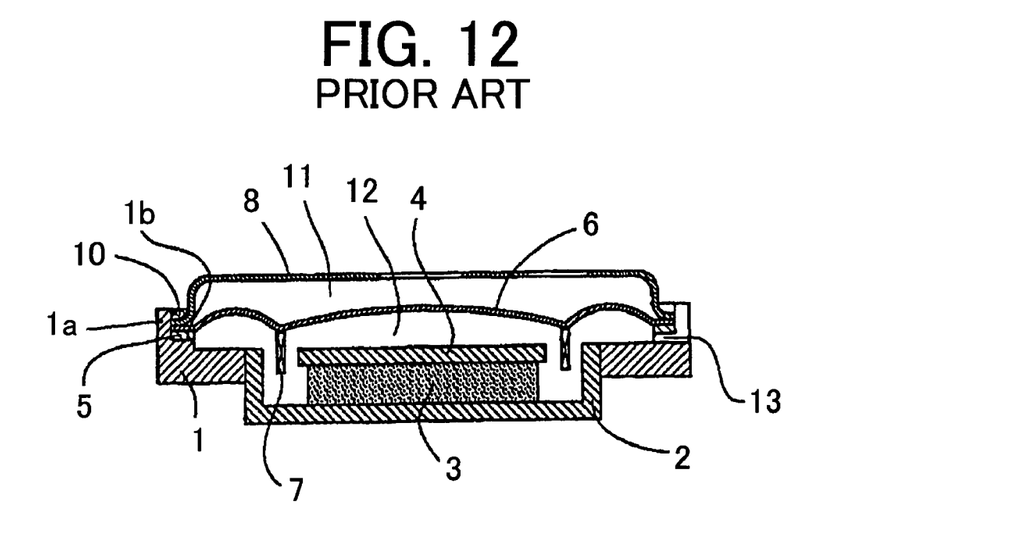
FIG. 12 is a sectional view taken along a line XII—XII of FIG. 11.

FIG. 11 is a plan view of a conventional speaker, and FIG. 12 is a sectional view taken along a line XII—XII of FIG. 11.

The speaker comprises an annular frame 1, a yoke 2 made of a magnetic material having a dish shape and secured to the inside wall of the frame 1, a permanent magnet 3 secured to the yoke, and a top plate 4 secured to the upper surface of the permanent magnet 3.

Figure 13:
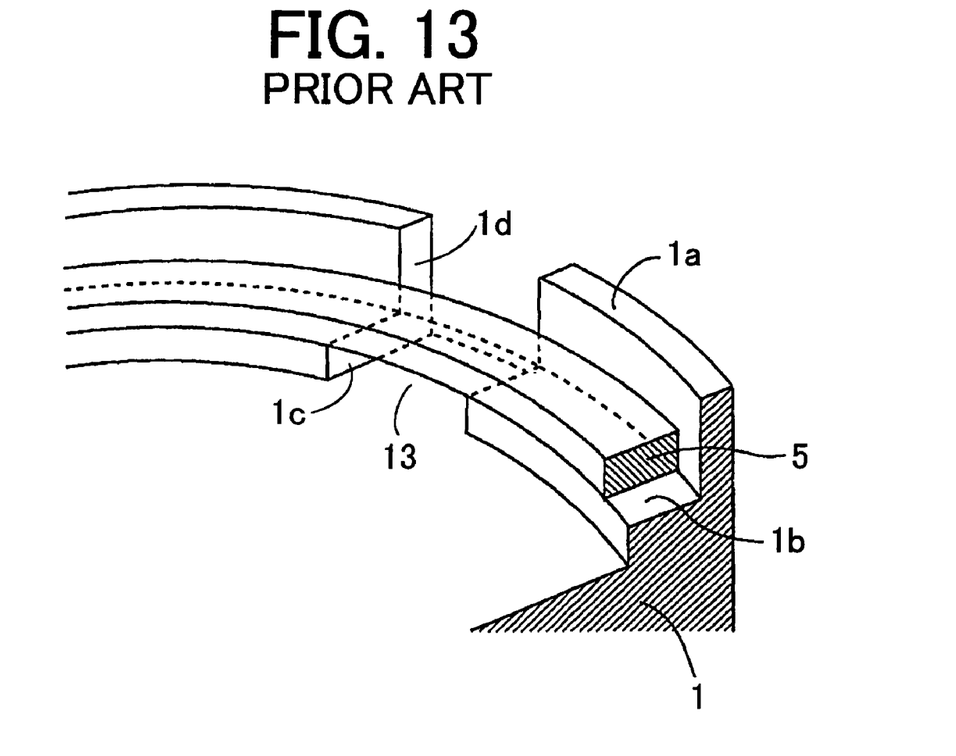
FIG. 13 is a perspective view of a part of a frame.

As shown in FIG. 13, the frame 1 has a peripheral annular projection 1a and shoulder 1b. In the projection 1a and the shoulder 1b, four slits 1d and grooves 1c which are communicated with each other are formed at a regular interval as shown in FIG. 11. An annular plate 5 is fixed on the shoulder 1b. A diaphragm 6 having a voice coil 7 is adhered on the annular plate 5 at the periphery thereof, and a protector 8 is mounted on the periphery of the diaphragm and secured to the projection 1a of the frame 1 with an adhesive 10. Thus, a front chamber 11 and a back chamber 12 are formed on the front side and rear side of the diaphragm 6, and a back chamber sound discharge hole 13 is formed in each groove 1c. A plurality of front chamber sound discharge holes 14 are formed in the protector 8.

Figure 14:
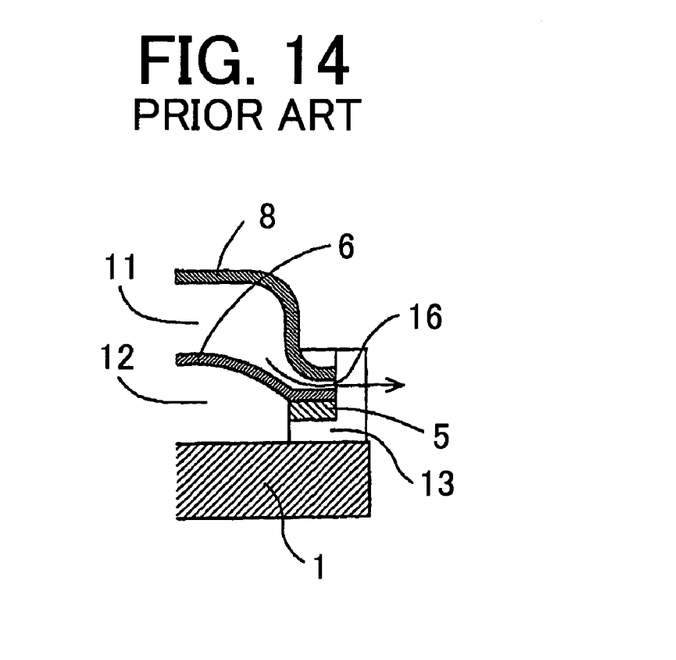
FIG. 14 is an enlarged sectional view of a part of the speaker.

In the speaker, since there is formed the slit 1d in the projection 1a, the protector 8 is not adhered to the projection 1a at the slit 1d. Consequently, it may happen that the protector 8 is not completely secured to the diaphragm 6, and a gap 16 is formed between the protector 8 and the diaphragm 6 as shown in FIG. 14. As a result, sounds in the front chamber 11 discharge passing through the gap 16. The discharged sound is in opposite phase to the sound discharged from the back chamber sound discharge hole 13. Therefore, both the sounds act to cancel each other, thereby reducing the sound discharged from the discharge hole 14.

SUMMARY OF THE INVENTION

An object of the present invention is to provide an electroacoustic transducer which may prevent the reduction of discharge sound.

According to the present invention, there is provided an electroacoustic transducer comprising a frame having an annular peripheral projection and an annular shoulder formed on an inside wall of the peripheral projection, a diaphragm provided in the frame, a protector provided above the diaphragm, slits axially formed in the peripheral projection, grooves radially formed in the shoulder, each of the grooves being communicated with a corresponding slit, an annular plate secured to the shoulder to form a sound discharge hole in each groove, thereby communicating a back chamber under the diaphragm with the atmosphere, projected part outwardly projected from a peripheral edge of either the diaphragm or the annular plate, an adhesive adhered to a peripheral edge of the protector and to an upper surface of the projected part.

These and other objects and features of the present invention will become more apparent from the following detailed description with reference to the accompanying drawings.

DETAILED DESCRIPTION OF THE PREFERRED EMBODIMENT

Figure 1:
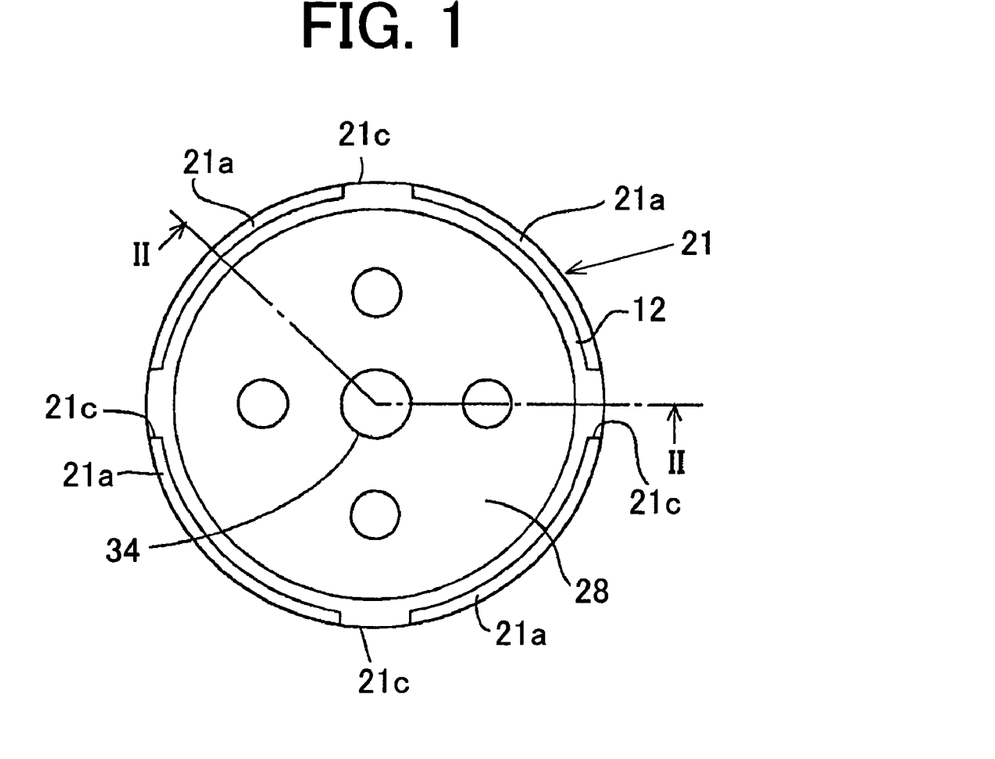
FIG. 1 is a plan view of a speaker according to a first embodiment of the present invention.
Figure 2:
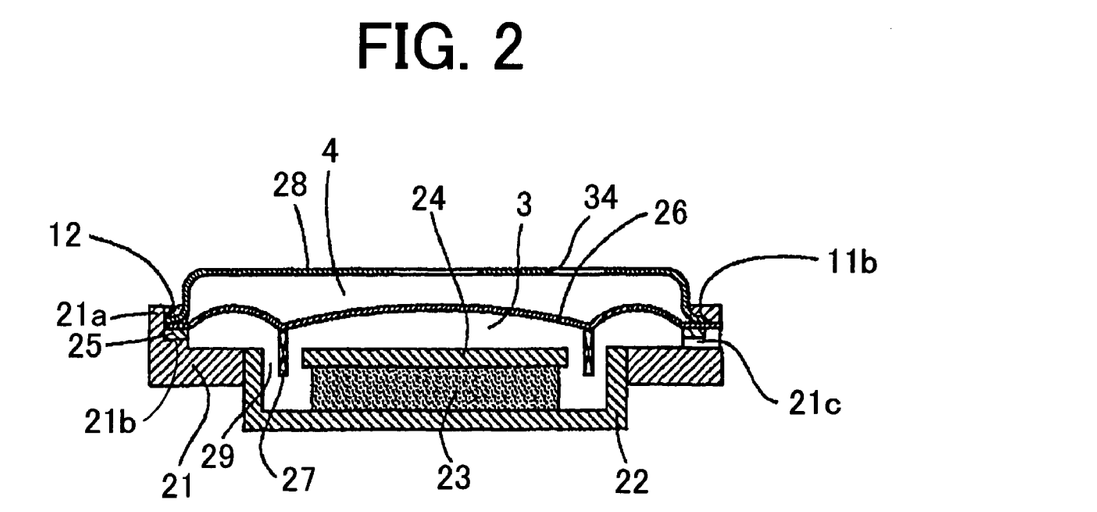
FIG. 2 is a sectional view taken along a line II—II of FIG. 1.

FIG. 1 is a plan view of a speaker according to a first embodiment of the present invention, and FIG. 2 is a sectional view taken along a line II—II of FIG. 1.

The speaker comprises an annular frame 21, a yoke 22 made of a magnetic material having a dish shape and secured to the inside wall of the frame 21, a permanent magnet 23 adhered to the yoke, and a top plate 24 secured to the upper surface of the permanent magnet 23. The yoke 22, permanent magnet 23 and top plate 24 form a magnetic circuit having a magnetic gap 29 between the yoke and the top plate.

Figure 3:
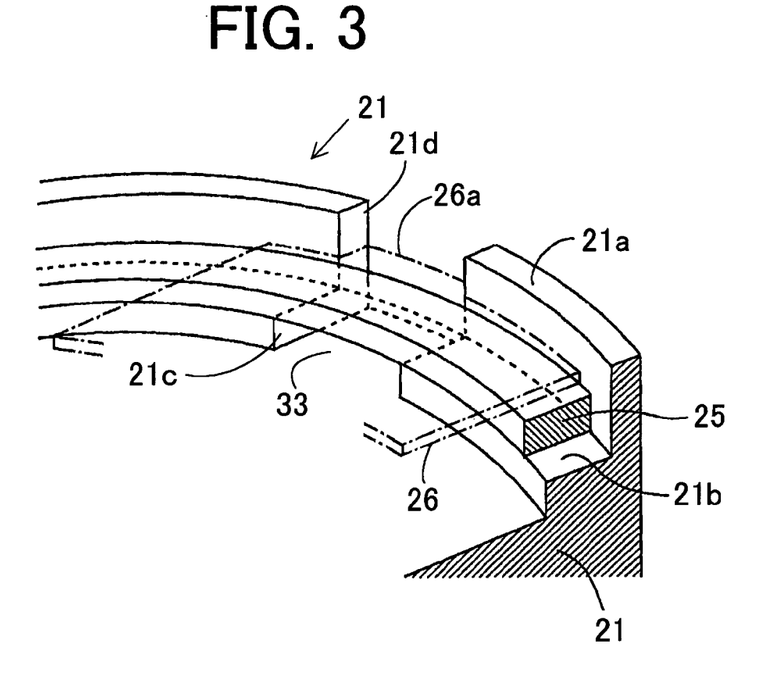
FIG. 3 is a perspective view of a part of a frame.
Figure 4:
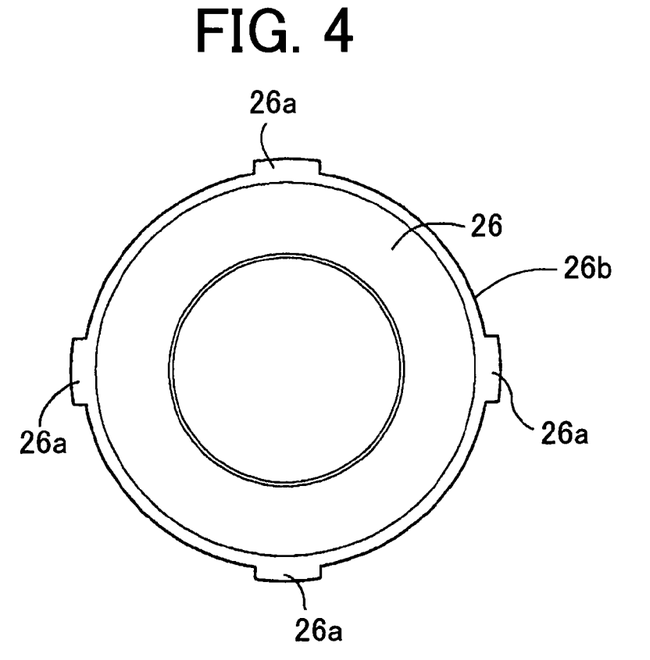
FIG. 4 is a plan view of a diaphragm.
Figure 5:
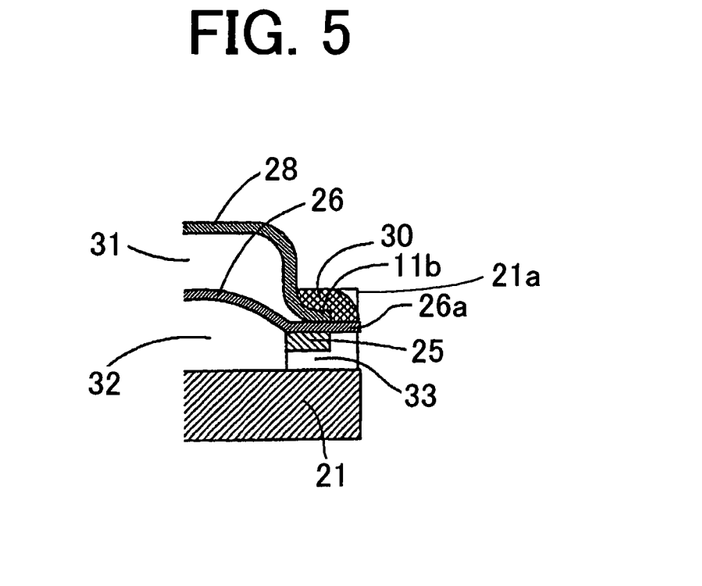
FIG. 5 is an enlarged sectional view of a part of the speaker.

As shown in FIG. 3, the frame 21 has a peripheral annular projection 21a and shoulder 21b. In the projection 21a and the shoulder 21b, four slits 21d and grooves 21c which are communicated with each other are formed at a regular interval as shown in FIG. 1. An annular plate 25 is fixed on the shoulder 21b. A diaphragm 26 having a voice coil 27 has four projections 26a projecting from a peripheral edge 26b thereof as shown in FIG. 4, corresponding to the slits 21d. As shown in FIG. 3, the projections 26a are inserted in the slits 21d and the voice coil 27 is inserted in the magnetic gap 29. The diaphragm 26 is adhered on the annular plate 25 at the periphery thereof. A protector 28 is mounted on the periphery of the diaphragm and secured to the projection 21a of the frame 21 and the projections 26a of the diaphragm 26 with an adhesive 30 as shown in FIG. 5. Thus, a front chamber 31 and a back chamber 32 are formed on the front side and rear side of the diaphragm 26, and a back chamber sound discharge hole 33 is formed in each groove 21c. A plurality of front chamber sound discharge holes 34 are formed in the protector 28.

In the speaker of the first embodiment, the projection 26a of the diaphragm 26 is provided in each slit 21d, and the portion of the protector 28 corresponding to the slit 21d is secured to the projection 26a. Consequently, the portion of the protector is not removed from the diaphragm 26. Thus, the sound in the front chamber does not discharge from the periphery of the frame, and hence the reduction of sound from the discharge holes 34 can be prevented.

Figure 6:
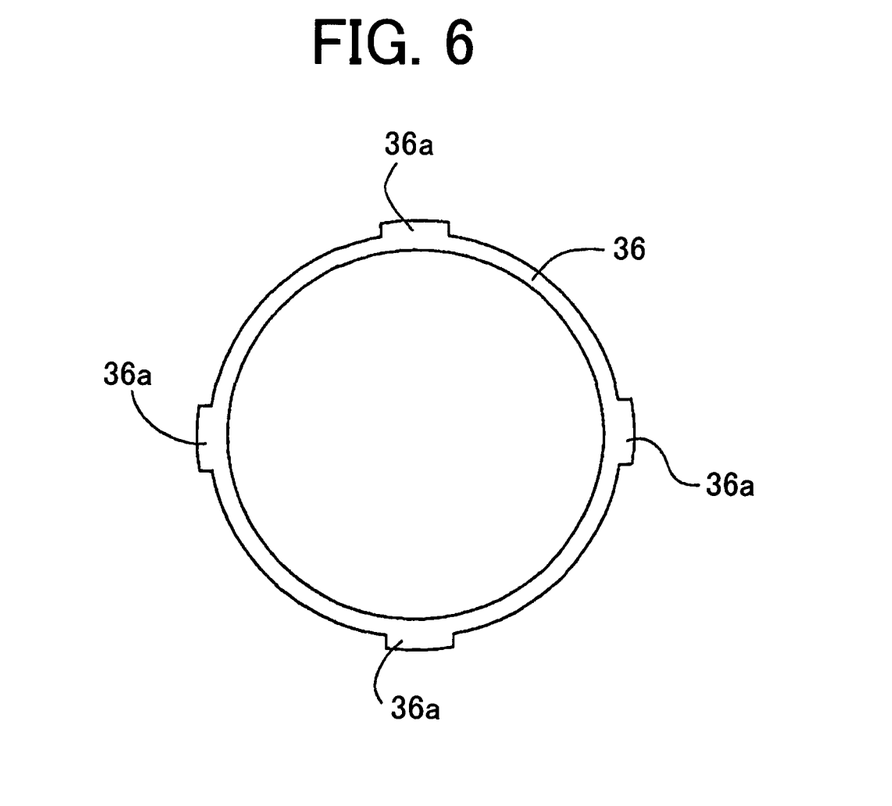
FIG. 6 is a plan view showing an annular plate of the second embodiment of the present invention.

FIG. 6 is a plan view showing an annular plate of the second embodiment of the present invention.

An annular plate 36 has four projections 36a corresponding to slits 21d. Other parts of the speaker of the second embodiment is substantially same as those of the speaker of the first embodiment, and hence the parts are identified by the same reference numerals as the first embodiment.

Figure 7:
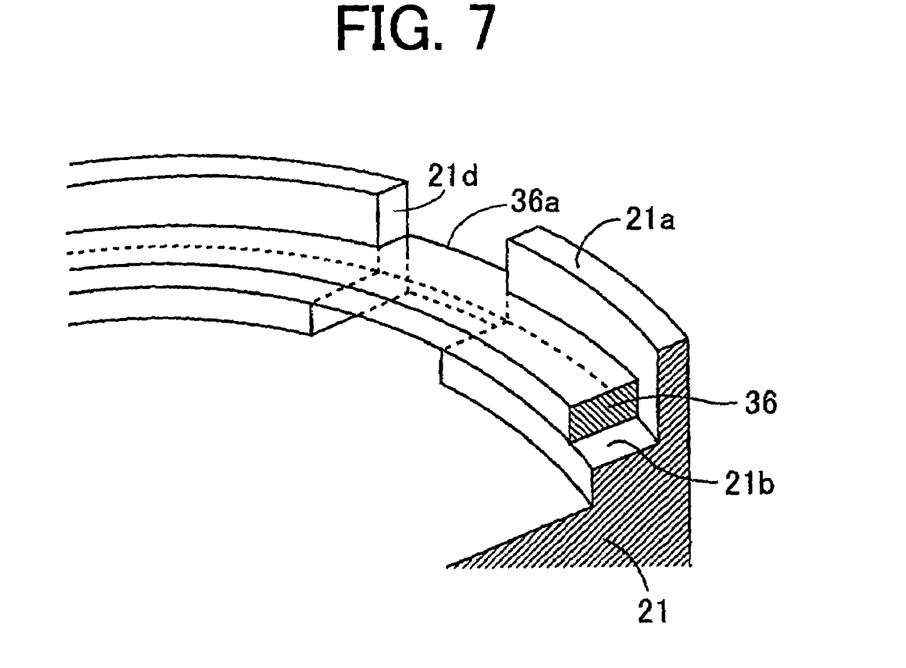
FIG. 7 is a perspective view of a part of a frame.
Figure 8:
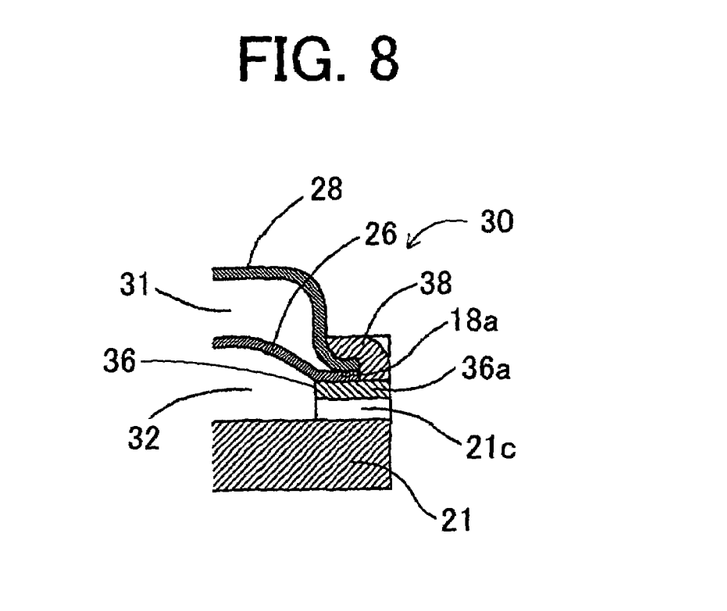
FIG. 8 is an enlarged sectional view of a part of the speaker.

As shown in FIG. 7, each projection 36a is inserted in the slit 21d, and the annular plate 36 is adhered to the shoulder 21b of the frame 21. The diaphragm 26 is adhered to the annular plate 36 and the protector 28 is mounted on the periphery of the diaphragm 26 and secured to the peripheral edge of the diaphragm and to the projection 36a of the annular plate 36 with an adhesive 38 as shown in FIG. 8.

In the speaker of the second embodiment, the projection 36a of the annular plate 36 is provided in each slit 21d and the portion of the protector 28 corresponding to the slit 21d is secured to the projection 36a and to the periphery of the diaphragm 26. Consequently, the portion of the protector is not removed from the diaphragm 26. Thus, the sound in the front chamber does not discharge from the periphery of the frame, and hence the reduction of sound from the discharge holes 34 can be prevented.

Figure 9A:
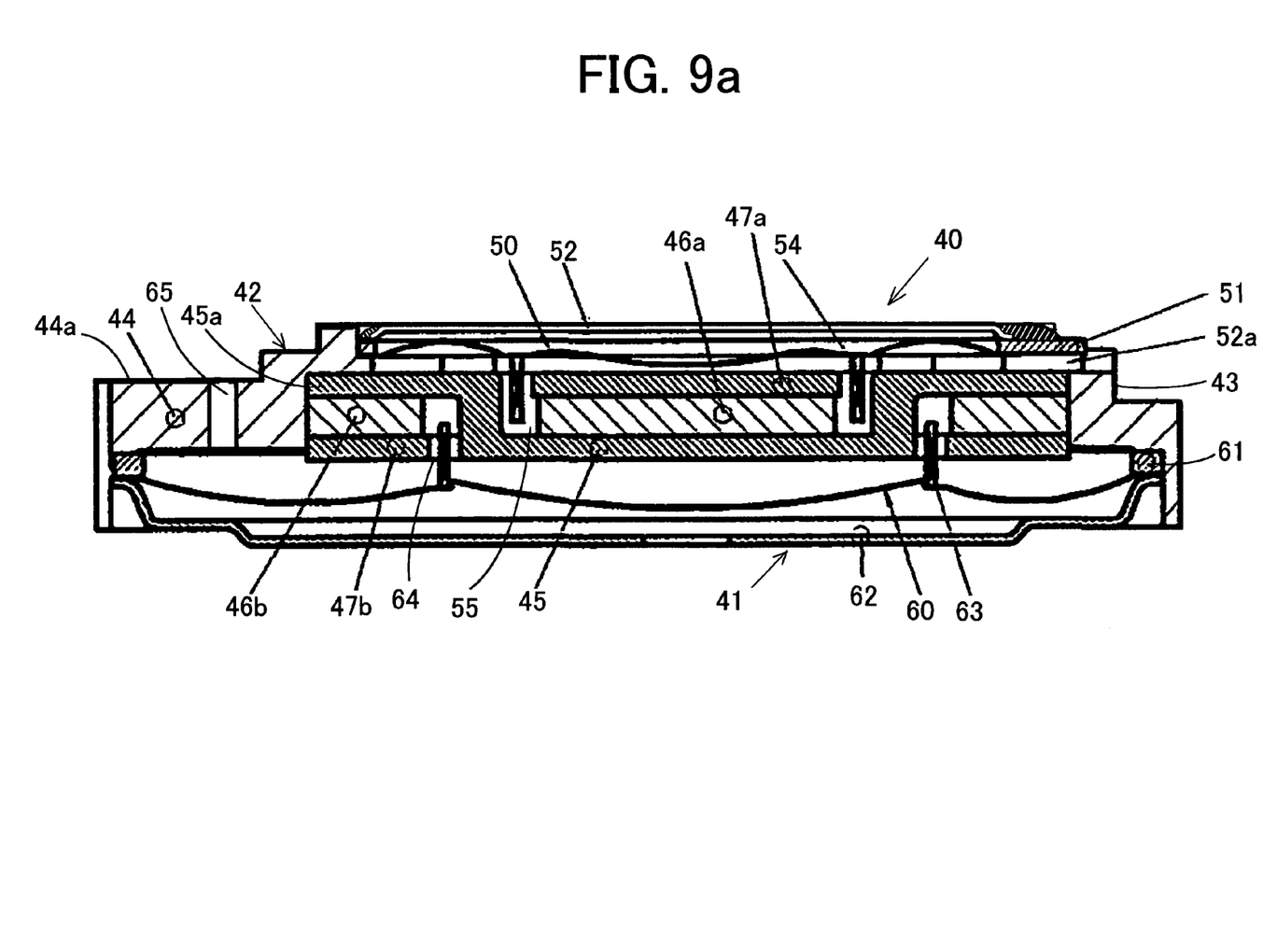
FIG. 9a is a sectional view showing a third embodiment of the present invention.
Figure 9B:
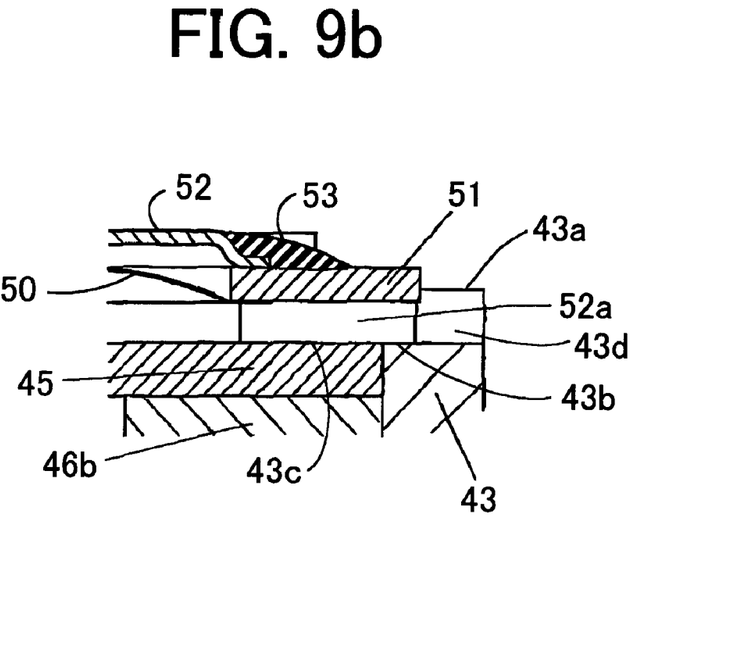
FIGS. 9b and 9c are enlarged sectional views of parts of FIG. 9a, respectively.
Figure 9C:
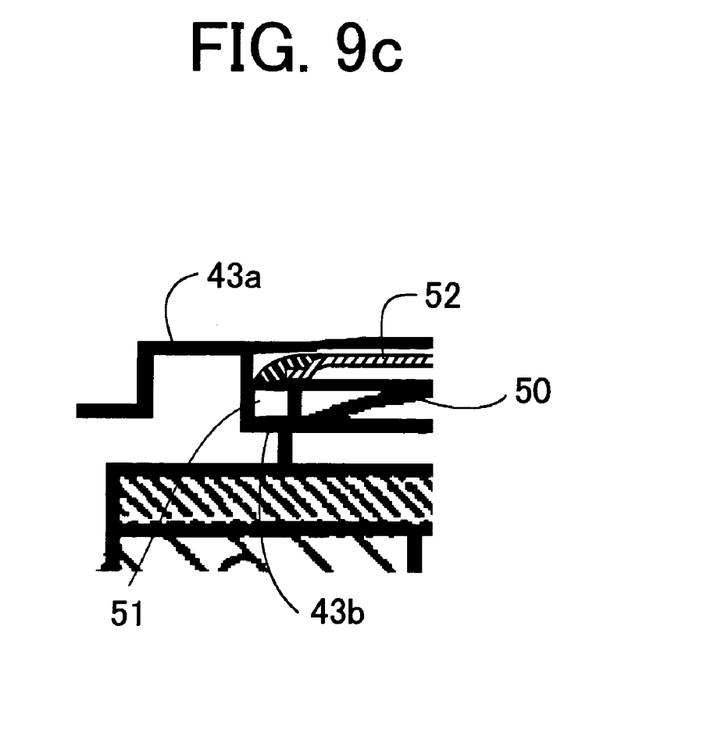
Figure 10:
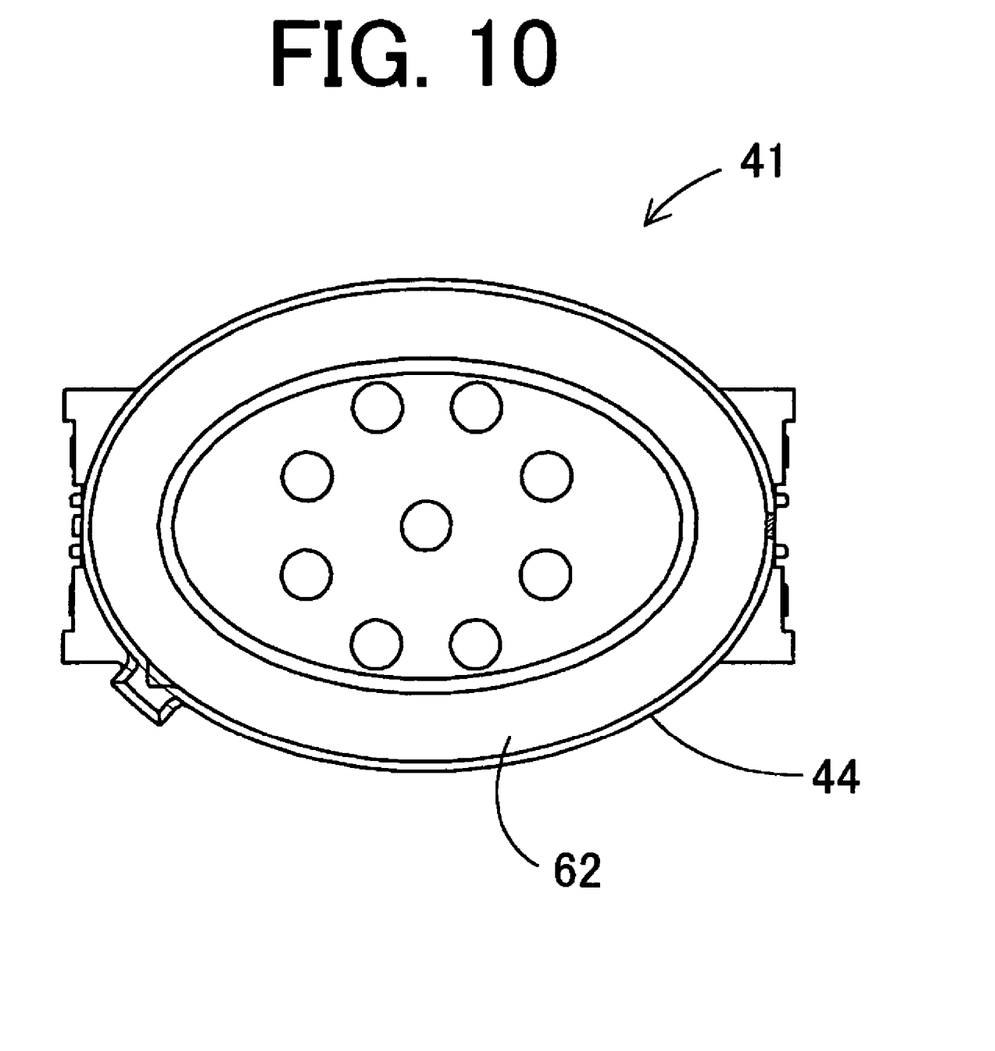
FIG. 10 is a plan view as viewed from the underside of the device.

FIG. 9a is a sectional view showing an electroacoustic transducer of a third embodiment of the present invention, FIG. 9b is an enlarged view of a part of FIG. 9a, and FIG. 10 is a plan view as viewed from the underside of the device.

The device of the third embodiment is characterized by integrally combining a speaker and a receiver used in a portable telephone. The receiver is provided as a telephone ringer which produces an audible calling signal.

The electroacoustic transducer comprises a receiver 40 and a speaker 41, provided in an integral frame 42. The integral frame 42 comprises a first frame part 43 for the receiver 40 and a second frame part 44 for the speaker 41. The first frame part 43 has a circular shape in plan view, and the second frame part 44 has an ellipse shape in plan view as shown in FIG. 10.

In the integral frame 42, there is provided a common yoke 45 having a flange 45a, a central first permanent magnet 46a adhered to the yoke, an annular second permanent magnet 46b secured to the underside of the flange 45a, a first top plate 47a secured to the upper surface of the first permanent magnet 46a, and a second top plate 47b secured to the underside of the second permanent magnet 46b.

As shown in FIG. 9b, the first frame part 43 of the receiver 40 has a peripheral annular projection 43a and shoulder 43b. In the projection 43a and the shoulder 43b, four slits 43d and grooves 43c which are communicated with each other are formed.

A diaphragm 50 is mounted on the shoulder 43b at the periphery thereof and an annular plate 51 is fixed on diaphragm 50 and the shoulder 43b. Thus, a receiver back chamber sound discharge hole 52a is formed in the groove 43c. A peripheral portion of a protector 52 is mounted on the annular plate 51 and secured thereto with an adhesive 53.

A voice coil 54 of the diaphragm 50 is inserted in a first magnetic gap 55 between the yoke 45 and the first top plate 47a.

On the other hand, in the second frame part 44 for the speaker 41, there is provided a diaphragm 60 secured to the frame part 44 through an annular plate 61 secured to the frame part and a protector 62 secured to the diaphragm 60. A voice coil 63 of the diaphragm 60 is inserted in a second magnetic gap 64 formed between the yoke 45 and the second top plate 47b.

Since the second frame part 44 has an elliptic shape in plan view, there is formed a projected portion 44a larger than the first frame part 43. Thus, four back chamber sound discharge holes 65 for the speaker are formed in the projected portion 44a around the first frame part 43 of the receiver 40. Each sound discharge hole 65 is axially provided for communicating the back chamber to the upper side atmosphere of the electroacoustic transducer.

In accordance with the present invention, the peripheral portion of the protector is perfectly closed, hence sound discharged from the periphery of the speaker does not occur. Thus, the normal production of sound is ensured.

While the invention has been described in conjunction with preferred specific embodiment thereof, it will be understood that this description is intended to illustrate and not limit the scope of the invention, which is defined by the following claims.

What is claimed is:

1. An electroacoustic transducer comprising:
    a frame having an annular peripheral projection and an annular shoulder formed on an inside wall of the peripheral projection;
    a diaphragm provided in the frame;
    a protector provided above the diaphragm;
    slits axially formed in the peripheral projection;
    grooves radially formed in the shoulder, each of the grooves being communicated with a corresponding slit;
    an annular plate secured to the shoulder to form a sound discharge hole in each groove, thereby communicating a back chamber under the diaphragm with the atmosphere;
    projected part outwardly projected from a peripheral edge of either the diaphragm or the annular plate;
    an adhesive adhered to a peripheral edge of the protector and to an upper surface of the projected part.

2. The electroacoustic transducer according to claim 1 wherein the projected part is a part projected from the diaphragm.

3. The electroacoustic transducer according to claim 1 wherein the projected part is a part projected from the annular plate.

4. The electroacoustic transducer according to claim 1 further comprising an additional electroacoustic transducer provided in the frame back to back with said transducer and having a permanent magnet, a top plate, a diaphragm and a protector each of which has a similar construction to said member, a plurality of back chamber sound discharge holes provided in a projected portion of the frame so as to communicate a back chamber to the upper side atmosphere of the transducer.

* * * * *